US011163655B2

(12) United States Patent
Kadayam et al.

(10) Patent No.: US 11,163,655 B2
(45) Date of Patent: *Nov. 2, 2021

(54) SYSTEMS AND METHODS FOR RESYNCHRONIZING MIRRORING PARTNERS IN A STORAGE SYSTEM

(71) Applicant: NetApp Inc., Sunnyvale, CA (US)

(72) Inventors: Harihara Kadayam, Fremont, CA (US); Vaiapuri Ramasubramaniam, Bangalore (IN); Rishabh Mittal, New Delhi (IN); Hrishikesh Keremane, Bangalore (IN)

(73) Assignee: NetApp Inc., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/804,028

(22) Filed: Nov. 6, 2017

(65) Prior Publication Data

US 2018/0074925 A1    Mar. 15, 2018

Related U.S. Application Data

(63) Continuation of application No. 14/950,508, filed on Nov. 24, 2015, now Pat. No. 9,811,432, which is a
(Continued)

(51) Int. Cl.
*G06F 11/20* (2006.01)
*G06F 12/0868* (2016.01)

(52) U.S. Cl.
CPC ...... *G06F 11/2082* (2013.01); *G06F 12/0868* (2013.01); *G06F 11/2058* (2013.01); *G06F 11/2074* (2013.01)

(58) Field of Classification Search
CPC ............. G06F 11/2082; G06F 11/2058; G06F 12/0868
See application file for complete search history.

(56) References Cited

U.S. PATENT DOCUMENTS 6,463,573 B1    10/2002   Maddalozzo, Jr. et al.
7,657,578 B1     2/2010   Karr et al.
(Continued)

OTHER PUBLICATIONS

Non-Final Office Action cited in U.S. Appl. No. 13/784,601 dated Jan. 22, 2015, 23 pgs.
(Continued)

*Primary Examiner* — Daniel D Tsui
*Assistant Examiner* — Nicholas A. Paperno
(74) *Attorney, Agent, or Firm* — Cooper Legal Group, LLC (57) ABSTRACT

Systems and methods which provide for managing multiple mirror resources in a storage distribution network are provided. In some embodiments, a system provides for both high availability and disaster recovery functionality at different mirroring locations. Other embodiments may provide for multiple high availability and/or multiple disaster recovery mirror resources. These mirror resources are operated in a heterogeneous manner in the sense that each have its own transport, protocol, and the like, but are configured function cooperatively or as a single mirror with respect to mirroring a primary node. Embodiments may provide for the mirroring and resynchronization of mirrored resources in the event of a communication loss with a particular resource without ceasing the mirroring operations to other resources.

20 Claims, 4 Drawing Sheets

Related U.S. Application Data continuation of application No. 13/784,601, filed on Mar. 4, 2013.

(56) References Cited

U.S. PATENT DOCUMENTS

| | | | |
|---|---|---|---|
| 8,145,838 | B1 | 3/2012 | Miller et al. |
| 8,688,643 | B1 | 4/2014 | Deopujari et al. |
| 8,984,243 | B1* | 3/2015 | Chen .................. G06F 3/065 711/162 |
| 2003/0177321 | A1 | 9/2003 | Watanabe |
| 2004/0205309 | A1 | 10/2004 | Watanabe |
| 2005/0071708 | A1 | 3/2005 | Bartfai et al. |
| 2005/0076336 | A1* | 4/2005 | Cutrell .................. H04L 45/302 718/100 |
| 2005/0223267 | A1 | 10/2005 | Fujibayashi |
| 2005/0256972 | A1 | 11/2005 | Cochran et al. |
| 2006/0203718 | A1 | 9/2006 | Benhase et al. |
| 2007/0195692 | A1 | 8/2007 | Hagglund et al. |
| 2010/0036931 | A1 | 2/2010 | Certain et al. |
| 2012/0011313 | A1 | 1/2012 | Kopylovitz et al. |
| 2012/0057537 | A1* | 3/2012 | Schein .................. H04W 72/10 370/329 |
| 2012/0254120 | A1 | 10/2012 | Fang et al. |
| 2012/0278566 | A1 | 11/2012 | Gilson |
| 2013/0054518 | A1* | 2/2013 | Anglin .................... G06F 16/27 707/610 |
| 2013/0326152 | A1 | 12/2013 | Loaiza et al. |

OTHER PUBLICATIONS

Reply Non-Final Office Action cited in U.S. Appl. No. 13/784,601 dated May 19, 2015, 11 pgs.
Final Office Action cited in U.S. Appl. No. 13/784,601 dated May 28, 2015, 15 pgs.
Reply Final Office Action cited in U.S. Appl. No. 13/784,601 dated Aug. 28, 2015, 9 pgs.
Final Office Action cited in U.S. Appl. No. 13/784,601 dated Sep. 16, 2015, 17 pgs.
Non-Final Office Action cited in U.S. Appl. No. 14/950,508 dated Feb. 23, 2017, 19 pgs.
Reply Non-Final Office Action cited in U.S. Appl. No. 14/950,508 dated May 23, 2017, 37 pgs.
Notice of Allowance cited in U.S. Appl. No. 14/950,508 dated Jun. 21, 2017, 14 pgs.
Amendment after Notice of Allowance cited in U.S. Appl. No. 14/950,508 dated Jun. 21, 2017, 9 pgs.
Notice of Allowance cited in U.S. Appl. No. 14/950,508 dated Sep. 29, 2017, 2 pgs.

* cited by examiner

SYSTEMS AND METHODS FOR RESYNCHRONIZING MIRRORING PARTNERS IN A STORAGE SYSTEM

RELATED APPLICATIONS

This application is a continuation of U.S. application Ser. No. 14/950,508, filed on Nov. 24, 2015, titled "SYSTEMS AND METHODS FOR RESYNCHRONIZING MIRRORING PARTNERS IN A STORAGE SYSTEM", which is a continuation of U.S. application Ser. No. 13/784,601, filed on Mar. 4, 2013, titled "SYSTEMS AND METHODS FOR RESYNCHRONIZING MIRRORING PARTNERS IN A STORAGE SYSTEM", which are incorporated herein.

TECHNICAL FIELD

The present invention relates generally to management of data within file systems and, more particularly, management of data which is mirrored in multiple locations in a storage network.

BACKGROUND OF THE INVENTION

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated and mirrored within the data storage system and/or between data storage systems during normal operation. For example, data storage systems may include disaster recovery (DR) resources that function as a backup for a primary storage resource. Other networks may provide for high availability (HA) resources that are configured to assist a primary storage resource when desired, e.g. during high traffic periods, to provide for faster data transfers. Such DR and HA systems obtain mirrored information of data residing on a primary storage resource.

In order to mirror information from a primary storage resource to a secondary storage resource, previous systems may utilize write cache that compiles write data from a client which is then stored to a more permanent storage location according to a pre-determined schema. For example, the write cache may be part of a DR node and function to compile data for the DR node until the cache resources are near full (or until another pre-determined condition is met), at which point the data residing on the write cache is transferred to DR storage. The point when write cache is cleared and its contents sent to storage may be referred to as a consistency point.

Significant issues with previous systems become apparent when attempting to resynchronize mirror resources. For example, in the event that a DR node becomes non-responsive and new data from a client is not being mirrored to the DR node, problems arise when bringing the DR node back on line. Specifically, the DR node must access information from the primary system and synchronize any changes in data which have been made since the last consistency point. However, this synchronization generally will affect client interaction with the storage system because the client cannot continue writing to the primary storage system while resynchronization is taking place due to the need to accurately track the contents of the storage system. Because of this, the performance provided to the client can suffer even when problems with secondary storage resources which are not currently being utilized are present.

Another issue with prior systems is that there are generally no usable methods to implement multiple mirror locations for a primary storage system. For example, prior art storage systems do not mirror a primary storage system that have separate HA and a DR nodes. Due to the added complexities which are apparent when utilizing both of these services, architectures which utilize both HA and DR resources place these resources at the same location (e.g. a remote DR location which may inhibit HA efficiency) and only utilize a single mirror. In other words, a layout with multiple mirror locations would require additional processing resources and includes other considerations which would generally cause such a layout to be discouraged. For example, the presence of multiple mirrored systems would exacerbate the above-noted problems as it would potentially double the likelihood of system down time, communication losses, and the like, which then potentially doubles the instances of needing resynchronization.

BRIEF SUMMARY OF THE INVENTION

The present application provides for systems and methods which provide for managing multiple mirror resources in a storage distribution network. In some embodiments, a system provides for both HA and DR functionality at different mirroring locations. Other embodiments may provide for multiple HA and/or multiple DR mirror resources. These mirror resources may be operated in a heterogeneous manner in the sense that each has its own transport, protocol, and the like, but are configured function cooperatively or as a single mirror with respect to mirroring a primary node.

In one embodiment, a management processing system is provided which is configured to control a storage system in order to allow for multiple mirroring resources. For example, in a network which includes a primary storage node that is mirrored with a HA node and a DR node, the management processing system may control/establish which nodes are utilized for mirror storage, control messages between a client and the selected nodes, monitor the nodes for failures, and control resynchronization of nodes coming back online after failures. The management processing system enables the mirroring to take place where a client may remain agnostic to one or more events within the storage network, e.g. where mirroring is occurring, whether failures have occurred, etc.

Embodiments may also provide for resynchronization of a mirror resource or primary node upon the resource/primary node coming back online from an outage within a storage network. This resynchronization may occur without need of disturbing a non-effected mirror resource and/or without halting client activity on the storage network. Further, resynchronization of a mirror resource may occur in a manner which is transparent to the client.

In accordance with one aspect, mirroring and resynchronization may be accomplished by creating multiple mirrored copies of the write cache of a primary storage portion. The write cache may include both written data from a client and metadata which corresponds to data provided by one or more elements within a storage network. In this manner, resynchronization of a node which has experienced a loss in communication may be accomplished by resynchronizing the write cache by the individual elements and by recovering data from previous consistency points on other mirror resources and the like, in a manner which does not disturb continuing writing/mirroring operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
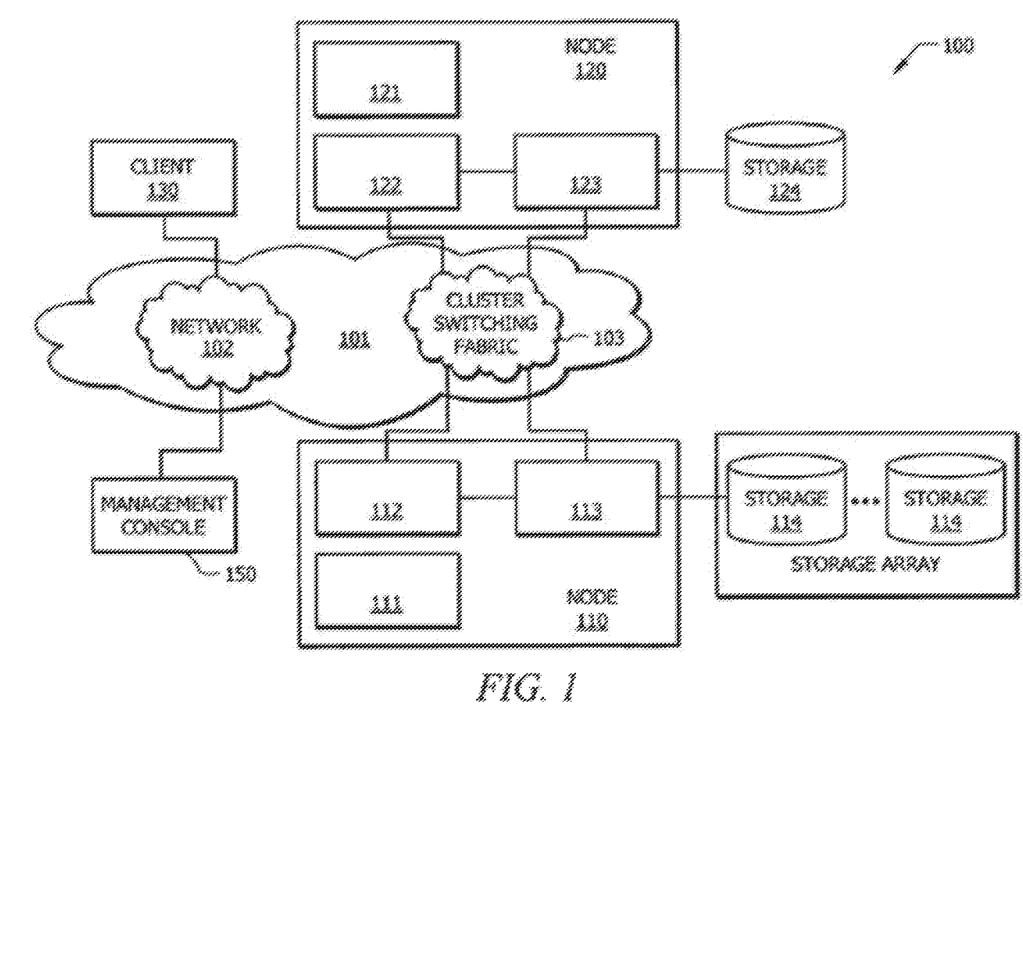
FIG. 1 is a block diagram of a storage system in accordance with an embodiment of the present application.

FIG. 1 provides a block diagram of storage system 100 in accordance with an embodiment of the present invention. System 100 includes a storage cluster having multiple nodes 110 and 120 which are adapted to communicate with each other and any additional node of the cluster. Nodes 110 and 120 are configured to provide access to data stored on a set of storage devices (shown as storage devices 114 and 124) constituting storage of system 100. Storage services may be provided by such nodes implementing various functional components that cooperate to provide a distributed storage system architecture of system 100. Additionally, one or more storage devices, such as storage array 114, may act as a central repository for storage system 100. It is appreciated that embodiments may have any number of edge nodes such as multiple nodes 110 and/or 120. Further, multiple storage arrays 114 may be provided at the multiple nodes 110 and/or 120 which provide resources for mirroring a primary storage data set.

Illustratively, nodes (e.g. network-connected devices 110 and 120) may be organized as one or more network elements 112 and 122 and/or storage elements 113 and 123 and management elements 111 and 121. Network elements may include functionality to enable nodes to connect to one or more clients (e.g. network-connected device 130) over computer network 101, while storage elements may connect to storage devices (e.g. as may implement a storage array). Management elements may provide cluster communication services between nodes for generating information sharing operations and for presenting a distributed file system image for system 100. Functionality for enabling each node of a cluster to receive name and object data, receive data to be cached, and to communicate with any other node of the cluster may be provided by management elements adapted according to embodiments of the invention.

It should be appreciated that network 101 may comprise various forms, and even separate portions, of network infrastructure. For example, network-connected devices 110 and 120 may be interconnected by cluster switching fabric 103 while network-connected devices 110 and 120 may be interconnected to network-connected device 130 by a more general data network 102 (e.g. the Internet, a LAN, a WAN, etc.).

It should also be noted that while there is shown an equal number of network elements and storage elements constituting illustrated embodiments of nodes, there may be a different number and/or type of functional components embodying nodes in accordance with various embodiments of the present invention. For example, there may be multiple network elements and/or storage elements interconnected in system 100 that do not reflect a one-to-one correspondence between the modules of network-connected devices 110 and 120. Accordingly, the description of network-connected devices 110 and 120 comprising one network element and one storage element should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g. node configurations, operating metrics) from or provide information to the nodes. In addition, management console 150 may be configured to receive inputs from and provide outputs to a user of system 100 (e.g. storage administrator) thereby operating as a centralized management interface between the administrator and system 100. In the illustrative embodiment, management console 150 may be networked to network-connected devices 110-130, although other embodiments of the present invention may implement management console 150 as a functional component of a node or any other processing system connected to or constituting system 100.

Management console 150 may also include processing capabilities and code which is configured to control system 100 in order to allow for multiple mirroring resources of stored data. For example, system 100 may include a primary storage node for storing data and multiple secondary nodes which are configured act as mirroring resources for the primary node. In such an example system, management console 150 may establish/control which nodes are utilized for mirror storage, control messages between a client and the selected nodes, monitor the nodes for failures, and control resynchronization of nodes coming back online after failures.

In a distributed architecture, network-connected device 130 may submit an access request to a node for data stored at a remote node. As an example, an access request from network-connected device 130 may be sent to network-connected device 120 which may target a storage object (e.g. volume) on network-connected device 110 in storage 114. This access request may be directed through network-connected device 120 due to its proximity (e.g. it is closer to the edge than a device such as network-connected device 110) or ability to communicate more efficiently with device 130. To accelerate servicing of the access request and optimize cluster performance, network-connected device 120 may cache the requested volume in local memory or in storage 124. For instance, during initialization of network-connected device 120 as a cluster node, network-connected device 120 may request all or a portion of the volume from network-connected device 110 for storage at network-connected device 120 prior to an actual request by network-connected device 130 for such data.

As can be appreciated from the foregoing, in order to operate as a cluster (e.g. the aforementioned data storage system), network-connected devices 110-130 may communicate with each other. Such communication may include various forms of communication (e.g. point-to-point or unicast communication, multicast communication, etc.). Accordingly, to effectively cooperate to provide desired operation as a logical entity, each node of a cluster is provided with the capability to communicate with any and all other nodes of the cluster according to embodiments of the invention.

Figure 2:
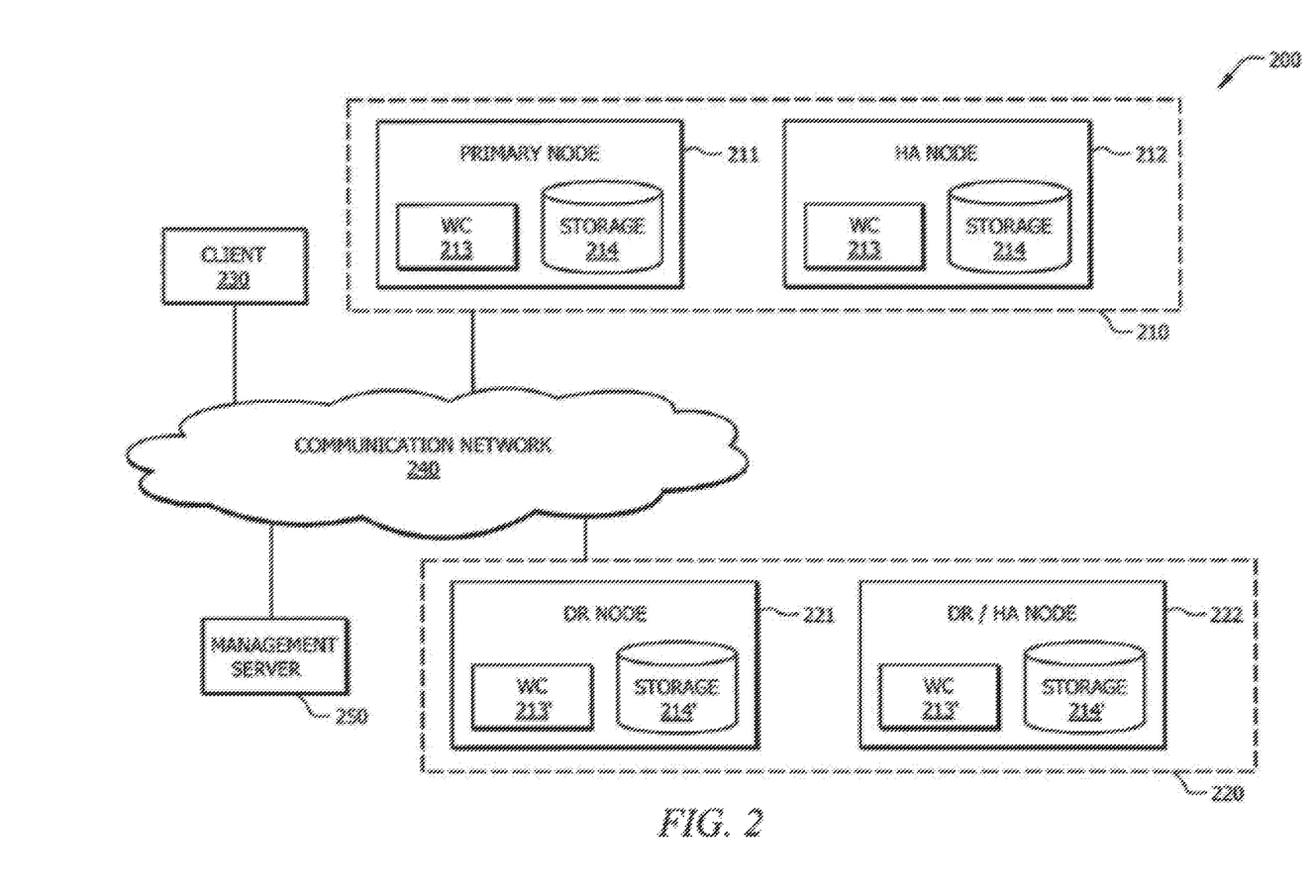
FIG. 2 is a block diagram of a storage system in accordance with an embodiment of the present application.

FIG. 2 illustrates an HA storage network 200 in accordance with an embodiment of the present application. It is noted that while much of the discussion herein of embodiments and functionality of the invention is made in the context of being implemented in a HA environment, embodiments may be implemented within many types of networks (such as storage system 100). Further, various nodes and devices of storage network 200 may be implemented in the manner as discussed above with respect to the devices and functionality of storage system 100.

HA storage network 200 includes a first cluster 210 having primary node 211 and HA node 212, and a second cluster 220 which is remotely located with respect to first cluster 210 and has DR node 221 and DR/HA node 222. A client 230 may write data which is directed to primary node 211 of first cluster 210 via communication network 240.

Additionally, management server 250 comprises processing circuitry which is configured to provide for control of the information flow across HA storage network 200.

It is noted that various portions of HA storage network 200 (e.g. the nodes, communications, clients, management console/server etc.) may be implemented as discussed above with respect to storage system 100. It is further noted that first cluster 210 and second cluster 220 may include additional nodes, however, the presently illustrated embodiment has been simplified for the sake of describing the novel concepts provided for herein. Additionally, the designation of primary node 211, HA node 212 and DR node 221 are set forth with respect to client 230. In some embodiments, a different client may utilize DR node 221 as a primary node, DR/HA node 222 as an HA node, and primary node 211 would be the DR node with respect to the different client. Such clients may exist simultaneously in HA storage network 200 in accordance with embodiments described herein. Further, management server 250 may be implemented as a stand-alone processing server, may function in conjunction with processing capabilities of one or more nodes, or may be implemented entirely within the processing capabilities of one or more nodes.

In one use example, management server 250 may establish a primary node for storing information, such as primary node 211, for client device 230. Management server 250 may also establish a plurality of secondary nodes which are configured to mirror the information written to primary node 211. Determining the primary and secondary nodes may be accomplished manually or automatically. For example, the designation of a primary node and secondary nodes may be implemented by an administrator with access to management server 250. Additionally, automated determinations may be implemented where a determination is based on one or more system properties (e.g. capacity of particular nodes, communication capabilities and/or bandwidth between nodes, etc.). In the illustrated HA storage network 200, client 230 may be assigned HA node 212 and DR node 221 as mirroring nodes. In this manner, client 230 may initiate a write command which causes data to be written or modified in primary node 211, whereupon management server 250 causes the data to also be written within HA node 212 and DR node 221.

Management server 250 may be configured to manage the node partitions used by a client and retain information regarding addressing/extensions of these partitions and any other information which is helpful to control data flow and monitor the functions of devices communicating within HA network 200. For example, management server 250 may be configured to monitor the network devices for various states such as states which reflect whether: the primary storage node 211 is online, the HA node 212 is online and synchronized with primary node 211, and whether the DR node is online and synchronized with the primary storage node 211 and/or HA node 212. States which reflect whether mirror devices have lost communication, whether switchovers have occurred (e.g. a switchover from a primary node to a DR node), etc., may also be monitored. Such monitoring may be implemented in any manner which provides relevant data to management server 250. For example, various portions of HA network 200 may be configured to provide a periodic signal (e.g. a heartbeat signal) to one or more devices in the network. Management server 250 may monitor such signals to determine whether a particular device is functioning properly. Additionally, in some embodiments, management server 250 may periodically ping one or more devices in HA network 200 and monitor the response to determine whether a particular device is functioning properly. Further, in some instances, a device which is experiencing abnormal operations may also be configured to provide error messages to management server 250.

When management server 250 discovers a problem (e.g. receives an error message, fails to receive a heartbeat signal or a response to a test signal, etc.) within HA storage network 200, management server 250 may initiate recovery procedures. It is noted that recovery procedures in accordance with some embodiments may be implemented without the knowledge and/or without affecting various devices communicating in network 200. For example, in the event that HA node 212 loses communication within network 200, management server 250 may function to take that mirror offline without affecting the mirroring of DR node 221. Further, in some embodiments, client 230 may be agnostic to this loss in communication. Upon communication being reestablished to HA node 212, management server 250 may control the resynchronization of data to HA node 212. This resynchronization may utilize data from one or more of the other storage resources which has retained the most current data set as a result of their continued functioning (e.g. primary node 211 and DR node 212), and may also be implemented in a manner where one or more of such storage resources are agnostic to the return and resynchronization of HA node 212.

Similarly, in the event that communication is lost to one or more of DR node 221 or primary node 211, management server 250 may redirect storage writing and mirroring traffic to account for the failure in communication. HA storage network 200 may further include DR/HA node 222. Such a node may be implemented as a second DR node having another mirror of the data of primary node 211. Further, in some embodiments, upon the DR node taking over in the event that primary node 211 has lost communication with storage network 200, management server 250 may cause DR/HA node 222 to function as an HA resource for client 230. Embodiments may also omit the use of DA/HA node 222.

As illustrated above, embodiments may mirror secondary nodes is in a cooperative manner such that the data mirrors to multiple locations or nodes are uniform. Such uniformity may include one or more of maintaining the same data at the same time (or substantially the same time in consideration of network communications timing), maintaining the same consistency points, maintaining uniform metadata entries where applicable, and the like. Such cooperation allows for efficient distribution and resynchronization of data to the various nodes.

Each node of FIG. 2 is illustrated as including a write cache (WC) portion 213/213' and a storage portion 214/214' which are designated for client 230. It is noted that write cache 213 may temporarily contain data written by client 230 and may contain metadata which assists in the functioning of the overall storage network 200. Storage portion 214 contains storage data on a more permanent basis. In some embodiments write cache portion 213/213' may store data on a device which is separate from data stored on storage portion 214/214', while in other embodiments, such storage may be implemented on the same device. Further, as illustrated, storage portion 214 is part of an overall node, however, such storage may be implemented within its own array that is in communication with a node (such as illustrated with respect to storage 114 and 124 of FIG. 1).

As discussed above, write cache 213 may include metadata. This data may include data from various elements which are executed within storage network 200, each of which may have dedicated space within allotted the write cache. For example, write cache 213 may contain data from a file system element, RAID element, and/or a disk ownership element. A large portion of the write cache may be dedicated to an element for the storage of application data (e.g. in a WAFL file system).

Metadata from these elements may include information regarding where to direct mirroring data, how many mirroring data entries are valid, where mirroring data information reside, and the like. Typically, this information is contained in headers of the set of data logs. It is noted that consistency of this metadata at the mirroring resources assists in the smooth takeover of the resource in the event of one or more of the nodes losing communication with network 200 as it may provide for control data to be present at the mirrored resource.

Because the metadata sent to write cache 213 is sent by various elements, network 200 includes controls to insure that such metadata is mirrored to other write cache portions such as write cache portion 213'. Such controls may be included within management server 250, or may be part of the processing resources of a particular node. For example, in some embodiments, processing resources at a node, such as primary node 214, may monitor data written to write cache 213 and may direct some or all of that data toward other networking resources, such as to resources on DR node 221 and HA node 212, based on information contained in the data. In other embodiments, management server 250 may monitor data transmitted to a particular node and may provide instructions to that node and cause the node to mirror data to another node. It is appreciated that the tasks of monitoring data and control over directing such data to various devices in network 200 may be distributed among processing resources in any manner which allows for efficient functionality of the embodiments described herein.

It is noted that write cache 213 may be mirrored to other nodes under control of management server 250. Alternatively, management server 250 may provide primary node 211 with the information on where to send mirror data and primary node 211 may send multiple mirroring data signals to other portions of network 200, e.g. to HA node 212 and DR node 221. Such mirroring to multiple resources may be accomplished without knowledge of client 230. In the event that a link goes down within network 200, management server 250 will receive an indication (e.g. a message from one or more devices, or a lack of response from a pinging message, failure to receive a heartbeat signal, etc.) that there is a failure in synchronization and may cause the mirroring of the inactive resource to be taken offline either by ceasing communications or by causing primary node 211 to cease communications to the failed resource, while not affecting other mirroring actions.

When the mirroring resource comes back online, a resynchronization between the primary node and the mirroring node may then be desired. To accomplish this resynchronization the write cache may be split into multiple sections and metadata from the individual elements may be written on an element-by-element basis. This may be accomplished in any order according to preferences that may be established by an administrator, e.g. according to availability of network resources, according to a priority of elements, etc. While this occurs, the other elements may continue mirroring to the other mirror locations within network 200. In this manner, resynchronization of the metadata of the write cache 213 may be accomplished in a manner that is transparent to client 230 and may be done without affecting the other mirroring resources.

In normal operation, the data residing on write cache is written and at specified times or when the write cache buffer is full, the data is written from the buffer (or flushed) to storage portion 214. In some embodiments, this flush may also be the point when the data is mirrored to other nodes, however, other points may be created for this mirroring. Each time these flushes occur, a consistency point is created. Accordingly, resynchronizing the data to a node which is recovering from a failure may be accomplished by circulating data storage areas created by the consistency points from other portions within the storage network, such as other mirroring resources and the like. This resynchronization may take place without the knowledge of the client and while the client continues to write data to the system and mirroring to each of the mirroring resources continues.

In some embodiments, the above mirroring which includes mirroring of data and metadata may provide for advantages in disaster recovery circumstances. For example, the mirroring between primary cluster 210 and secondary cluster 220 may also include configuration mirroring. In the event that secondary cluster 220 needs to take over the entire functionality of primary cluster 210, such a takeover may be accomplished in a moderately seamless manner due to the fact that configuration information is already present on the secondary cluster. Such configuration information provides knowledge of contents and mapping within the mirrored data which would otherwise need to be derived by the system for efficient functionality.

As discussed above, the inventive concepts outlined herein are not limited to use within certain types of storage networks. For example, embodiments may be implemented in networks where nodes function apart from a cluster. Such embodiments may utilize additional control resources and/or additional metadata within the write cache where control resources within a cluster are not present. Such modifications may be implemented according to the available resources of a network and design preferences of a user.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
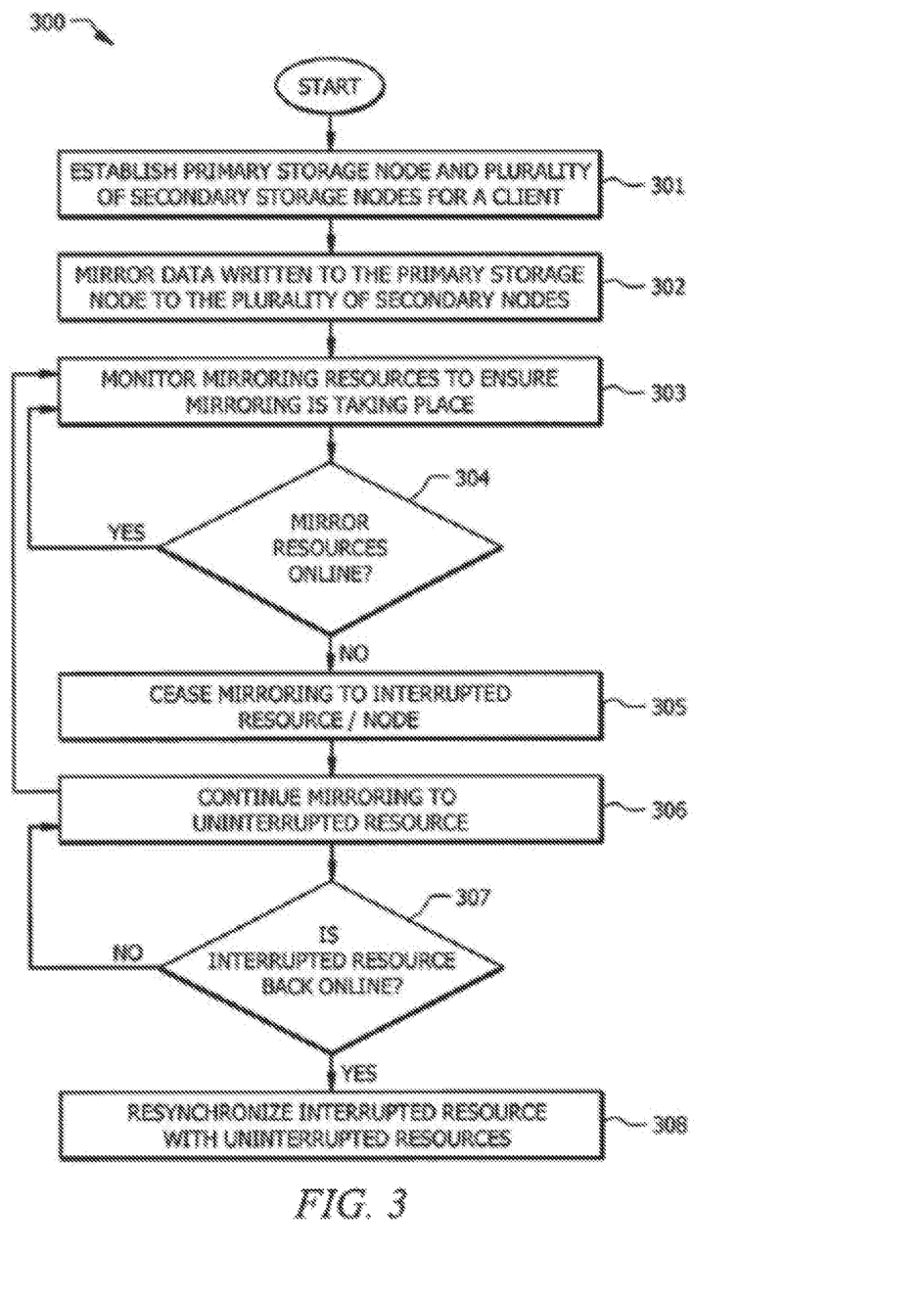
FIG. 3 is a flow diagram illustrating a method for mirroring content within a storage network in accordance with an embodiment of the present application.

FIG. 3 illustrates a method 300 for mirroring content within a storage network in accordance with an embodiment of the present application. It is noted that embodiments of method 300 may be implemented within the storage networks described above with respect to FIGS. 1-2. Specifically, method 300 may, at block 301, establish a primary storage node and a plurality of secondary storage nodes for a particular client. Such establishing of nodes for a client may be implemented by a controller within a storage network, such as management console 150 or management server 250.

Method 300 may further include, at block 302 mirroring data written to the primary storage node to the plurality of secondary storage nodes. This mirroring may be implemented as discussed above, e.g. mirroring may be implemented under the control of dedicated control resources, the primary node, or a combination of the above, and it may also be accomplished according to periodic intervals, at predetermined times such as off-peak processing periods, asynchronously, etc. Further, mirrored data may include data written at the direction of a client device and metadata which originates from other areas of the storage network.

At block 303, method 300 monitors the mirroring resources, e.g. the primary and secondary storage nodes, to ensure that mirroring is taking place, communication between network devices is functioning, and the like. For instance, management console 150 or management server 250 may implement a heartbeat process with the primary and secondary storage nodes to confirm proper functioning of one or more network components. At block 304, a determination is made as to whether the mirroring resources are functioning properly by e.g., receiving a heartbeat message from the respective mirroring resources. In the event that the mirroring resources are functioning properly at block 304, method 300 continues monitoring the mirroring resources. In the event that a resource has lost communication with the network and/or that mirroring is otherwise interrupted, e.g. DR node 214 is no longer receiving mirroring data and an error message is received by the primary storage node after an attempt to send data to the secondary storage node, method 300 ceases mirroring to the interrupted mirroring resource at block 305. As described above, ceasing this mirroring may be done without affecting other mirroring resources. Accordingly, in the noted example, when DR node 214 loses communication with the storage network, mirroring may cease to DR node 214 without affecting mirroring to other nodes, e.g. HA node 212.

At block 306, method 300 continues mirroring to uninterrupted mirroring resources. As described above, this mirroring may be implemented based on a pre-determined configuration which may be either implemented by a management server, stored at a primary node, and the like. While mirroring, method 300 may continue to monitor whether mirroring resources are functioning properly at block 303 and may monitor to see whether an interrupted resource has come back online at block 307. Such monitoring may be implemented using various methods, e.g., by sending periodic messages to the interrupted resource and monitoring return messages, monitoring for messages sent by the resource, etc. Further, such monitoring may be implemented by one or more of a management server or a node in a network.

In the event that the interrupted resource is back online, methods of resynchronizing the resource with the uninterrupted resources may be implemented at block 308. For example, once an interrupted resource is back online, the resource, or other devices monitoring the resource (e.g. a management server, a different node, and the like), may request that the interrupted resource be resynchronized with one of the other mirroring resources. At that point, the interrupted resource is provided with the data which is needed to resynchronize with the other mirroring resources. This data resynchronization may be implemented on an element-by-element basis as discussed above. Additionally, as discussed above, such resynchronizing may be implemented without interrupting other mirroring activity.

Figure 4:
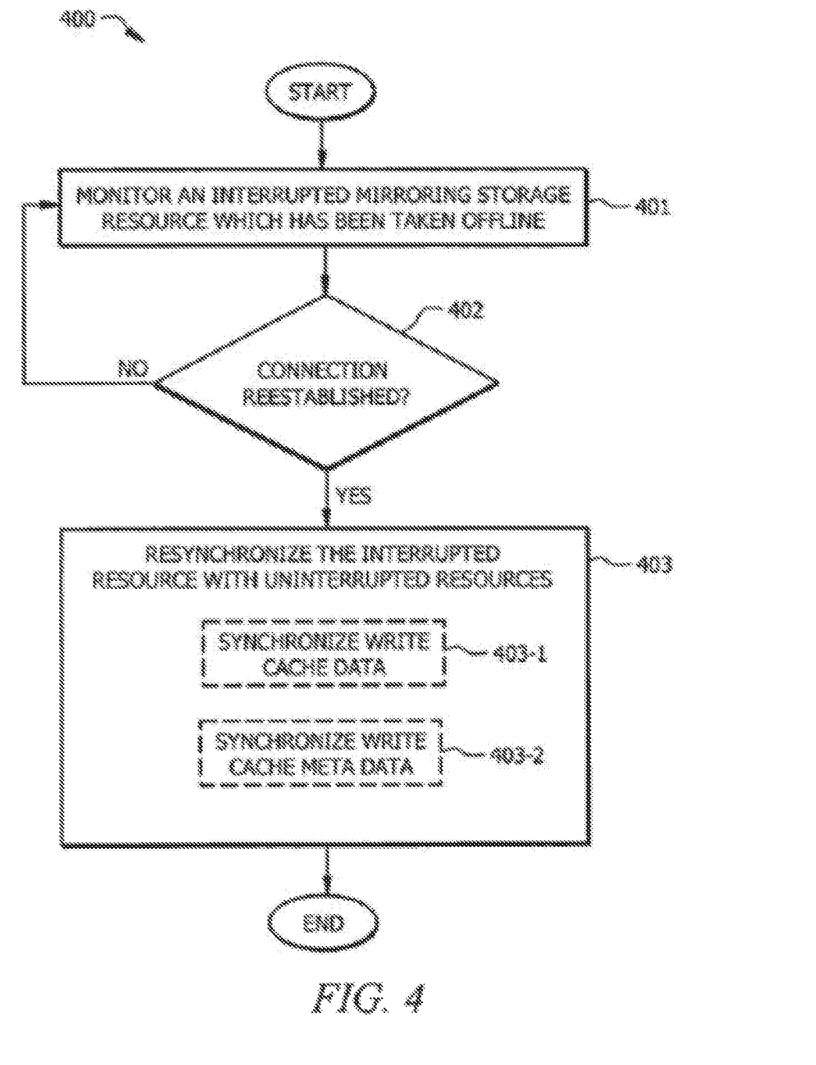
FIG. 4 is a flow diagram illustrating a method for mirroring content within a storage network in accordance with an embodiment of the present application.

FIG. 4 illustrates a method 400 for mirroring content within a storage network in accordance with an embodiment of the present application. More specifically, method 400 provides an example flow for resynchronizing a mirroring resource which has become out of synchronization with other mirroring resources. It is noted that as with the above method, embodiments of method 400 may be implemented within the storage networks described above with respect to FIGS. 1-2. Method 400 begins at block 401 with monitoring an interrupted mirroring storage resource which has been taken offline to determine if the resource capabilities has been reestablished. Decision block 402 notes that in the event that a connection has not been reestablished, method 400 may continue monitoring the interrupted resource.

In the event that the storage resource has come back online, method 400 resynchronizes the resource with the uninterrupted resources at block 403. This resynchronization may include synchronizing write cache data from one or more data mirroring resources at 403-1 and may include synchronizing write cache metadata from one or more of the data mirroring resources and/or other elements present in a storage network at 403-2. Further, this resynchronization may be implemented without ceasing the mirroring operations of other mirroring resources.

The functional blocks and modules of the above FIGS. 1-4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
concurrently mirroring data, written by a client to a storage resource of a node having a first mirroring relationship with a disaster recovery node and a second mirroring relationship with a high availability node, over a storage network to a disaster recovery resource of the disaster recovery node and a high availability resource of the high availability node; and
in response to the node and the disaster recovery node regaining communication capabilities subsequent to an interruption in data mirroring activity between the node and the disaster recovery node, resynchronizing the disaster recovery resource, comprising:
determining an ordering preference, derived from availability of network resources, with which elements of the storage network are to write metadata into sections of a write cache of the disaster recovery node, wherein the ordering preference is determined based upon a priority of the elements of the storage network;
instructing, on an element-by-element basis, the elements of the storage network to write the metadata into corresponding sections of the write cache based upon the ordering preference, wherein the write cache is split into a first section into which the metadata is written and a second section used to perform mirroring of operations between the storage resource and the high availability resource; and
recovering data from a previous consistency point of the high availability resource to the disaster recovery node.

2. The method of claim 1, comprising:
ceasing mirroring operations between the storage resource and the disaster recovery resource without ceasing mirroring operations between the storage resource and the high availability resource based upon detecting the interruption.

3. The method of claim 1, comprising:
automatically selecting the disaster recovery node for the disaster recovery mirroring relationship based upon bandwidth of the disaster recovery node.

4. The method of claim 1, comprising:
automatically selecting the high availability node for the high availability mirroring relationship based upon bandwidth of the high availability node.

5. The method of claim 1, wherein the resynchronization is performed while maintaining data mirroring activity from the storage resource to the high availability resource.

6. The method of claim 1, wherein the concurrently mirroring data comprises:
performing contemporaneous uniform mirroring of data to the disaster recovery node and the high availability node.

7. The method of claim 1, wherein the concurrently mirroring data comprises:
maintaining uniform metadata entries for the disaster recovery node and the high availability node.

8. The method of claim 1, wherein the concurrently mirroring data comprises:
maintaining a same consistency point and uniform metadata entries for the disaster recovery node and the high availability node.

9. The method of claim 8, wherein the maintaining uniform metadata entries comprises:

mirroring the metadata entries, comprising mirror data information, between write cache portions associated with the node, the disaster recovery node, and the high availability node.

10. The method of claim 8, wherein the uniform metadata entries are maintained within headers of a set of data logs.

11. The method of claim 1, wherein the concurrently mirroring data comprises:
synchronously mirroring data.

12. The method of claim 1, wherein the concurrently mirroring data comprises:
mirroring data at a pre-determined time corresponding to an off-peak processing period.

13. A non-transitory machine readable medium comprising machine executable code which when executed by a machine, causes the machine to:
concurrently mirror data, written by a client to a storage resource of a node having a first mirroring relationship with a disaster recovery node and a second mirroring relationship with a high availability node, over a storage network to a disaster recovery resource of the disaster recovery node and a high availability resource of the high availability node; and
in response to the node and the disaster recovery node regaining communication capabilities subsequent to an interruption in data mirroring activity between the node and the disaster recovery node, resynchronize the disaster recovery resource, comprising
determining an ordering preference, derived from availability of network resources, with which elements of the storage network are to write metadata into sections of a write cache of the disaster recovery node, wherein the ordering preference is determined based upon a priority of the elements of the storage network;
instructing, on an element-by-element basis, the elements of the storage network to write the metadata into corresponding sections of the write cache based upon the ordering preference, wherein the write cache is split into a first section into which the metadata is written and a second section used to perform mirroring of operations between the storage resource and the high availability resource; and
recovering data from a previous consistency point of the high availability resource to the disaster recovery node.

14. The non-transitory machine readable medium of claim 13, wherein the machine executable code causes the machine to:
automatically select the disaster recovery node for the disaster recovery mirroring relationship based upon capacity of the disaster recovery node.

15. The non-transitory machine readable medium of claim 13, wherein the machine executable code causes the machine to:
automatically select the high availability node for the high availability mirroring relationship based upon capacity of the high availability node.

16. The non-transitory machine readable medium of claim 13, wherein the machine executable code causes the machine to:
perform contemporaneous uniform mirroring of data to the disaster recovery node and the high availability node.

17. The non-transitory machine readable medium of claim 16, wherein the machine executable code causes the machine to:
maintain a same consistency point and uniform metadata entries for the disaster recovery node and the high availability node.

18. The non-transitory machine readable medium of claim 13, wherein the machine executable code causes the machine to:
mirror data at a pre-determined time corresponding to an off-peak processing period.

19. The non-transitory machine readable medium of claim 13, wherein the machine executable code causes the machine to:
mirror metadata entries, comprising mirroring data information, between write cache portions associated with the node, the disaster recovery node, and the high availability node.

20. A computing device comprising:
a memory comprising machine executable code; and
a processor coupled to the memory, the processor configured to execute the machine executable code to cause the processor to:
concurrently mirroring data, written by a client to a storage resource of a node having a first mirroring relationship with a disaster recovery node and a second mirroring relationship with a high availability node, over a storage network to a disaster recovery resource of the disaster recovery node and a high availability resource of the high availability node; and
in response to the node and the disaster recovery node regaining communication capabilities subsequent to an interruption in data mirroring activity between the node and the disaster recovery node, resynchronize the disaster recovery resource, comprising:
determining an ordering preference, derived from availability of network resources, with which elements of the storage network are to write metadata into sections of a write cache of the disaster recovery node, wherein the ordering preference is determined based upon a priority of the elements of the storage network;
instructing, on an element-by-element basis, the elements of the storage network to write the metadata into corresponding sections of the write cache based upon the ordering preference, wherein the write cache is split into a first section into which the metadata is written and a second section used to perform mirroring of operations between the storage resource and the high availability resource; and
recovering data from a previous consistency point of the high availability resource to the disaster recovery node.

\* \* \* \* \*